United States Patent
Larson et al.

(10) Patent No.: US 11,397,083 B1
(45) Date of Patent: Jul. 26, 2022

(54) GENERATING UPSAMPLED SIGNAL FROM GYROSCOPE DATA

(71) Applicant: Ironwood Cyber Inc., Dallas, TX (US)

(72) Inventors: Eric C. Larson, Garland, TX (US);
Mitchell Thornton, Dallas, TX (US);
Ian Johnson, Englewood, CO (US);
Travis Siems, Carrollton, TX (US);
Erik Gabrielsen, Dripping Springs, TX (US)

(73) Assignee: IRONWOOD CYBER INC., Dallas, TX (US)

( * ) Notice: Subject to any disclaimer, the term of this patent is extended or adjusted under 35 U.S.C. 154(b) by 393 days.

(21) Appl. No.: 16/702,116

(22) Filed: Dec. 3, 2019

Related U.S. Application Data

(60) Provisional application No. 62/776,238, filed on Dec. 6, 2018.

(51) Int. Cl.
| | |
|---|---|
| *G01C 19/5698* | (2012.01) |
| *G01C 19/5783* | (2012.01) |
| *G01C 19/5776* | (2012.01) |
| *G01C 19/50* | (2006.01) |

(52) U.S. Cl.
CPC ......... *G01C 19/5698* (2013.01); *G01C 19/50* (2013.01); *G01C 19/5776* (2013.01); *G01C 19/5783* (2013.01)

(58) Field of Classification Search
CPC ............... G01C 19/5698; G01C 19/50; G01C 19/5776; G01C 19/5783
See application file for complete search history.

(56) References Cited

U.S. PATENT DOCUMENTS

2019/0043491 A1* 2/2019 Kupryjanow ....... G10L 21/0208

OTHER PUBLICATIONS

"Gyrophone: Recognizing Speech From Gyroscope Signals", Michalevsky et al. (Year: 2014).*
Anand et al., "Speechless: Analyzing the threat to speech privacy from smartphone motion sensors." 2018 IEEE Symposium on Security and Privacy (SP). IEEE, May 20, 2018, 18 pages.

(Continued)

*Primary Examiner* — Xin Y Zhong
(74) *Attorney, Agent, or Firm* — Wilson Sonsini Goodrich & Rosati

(57) ABSTRACT

Gyroscope data can be used to generate upsampled signal. Multiple mobile devices are spaced apart from each other in a spatial arrangement. Each mobile device includes a gyroscope sensor to detect mechanical vibrations caused by signals originating within a vicinity of a mobile device that includes the gyroscope sensor. Each mobile device includes one or more respective processors to receive representations of the mechanical vibrations sensed by the gyroscope sensor at a sampling frequency, and transmit the representations received at the sampling frequency as a respective vibration signal associated with sampling times. The signal processor is coupled to the multiple mobile devices. The signal processor generates a processed upsampled signal by interleaving the vibration signal received from each mobile device and processing the interleaved signal using one or more machine learning filters, and transmitting the processed upsampled signal.

15 Claims, 5 Drawing Sheets

(56) References Cited

OTHER PUBLICATIONS

Han et al., "PitchIn: Eavesdropping via Intelligible Speech Reconstruction using Non-acoustic Sensor Fusion," 16th ACM IEEE Conference on Information Processing in Sensor Networks, Apr. 2017, 12 pages.

Michalevsky et al., "Gyrophone: Recognizing Speech from Gyroscope Signals," 23rd USENIX Security Symposium, Aug. 2014, 15 pages.

* cited by examiner

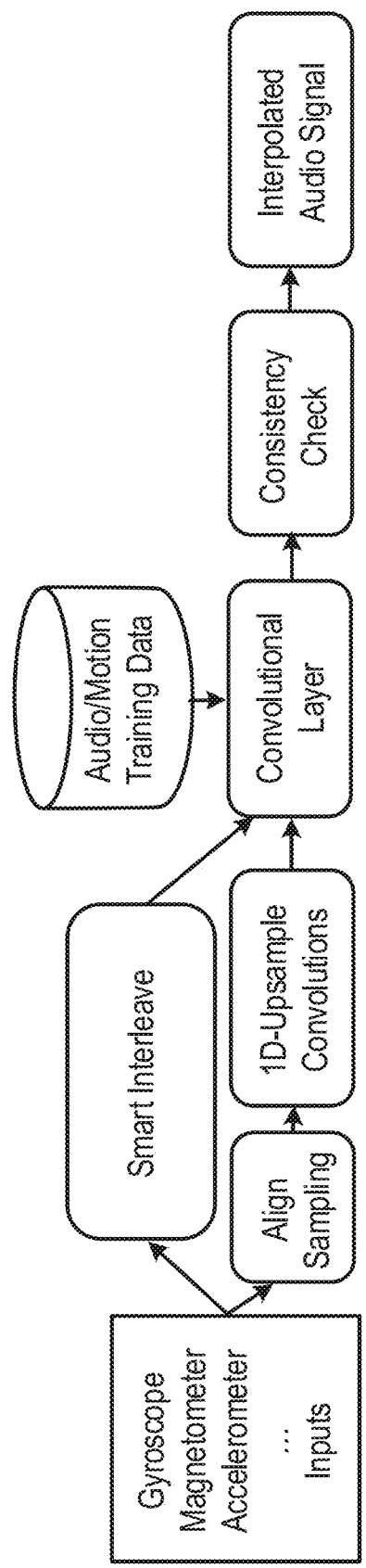

GENERATING UPSAMPLED SIGNAL FROM GYROSCOPE DATA

TECHNICAL FIELD

This disclosure relates to signal processing, for example, processing signals sensed as mechanical vibrations by certain sensors.

BACKGROUND

Certain devices, for example, mobile devices such as smartphones, tablet computers, or other devices, include sensors, for example, gyroscopes, that can sense device orientation. Such sensors can also detect vibrations produced by signals. For example, an audio signal produces mechanical vibrations that propagate through a medium from a source to a receiver. Gyroscopes can detect such mechanical vibrations.

SUMMARY

This disclosure describes technologies relating to generating upsampled signals from gyroscope data.

Certain aspects of the subject matter described in this disclosure can be implemented as a system that includes multiple mobile devices, a signal processor and a signal transmitter. The multiple mobile devices are spaced apart from each other in a spatial arrangement. Each mobile device includes a gyroscope sensor and one or more respective processors. The gyroscope sensor is configured to sense mechanical vibrations caused by signals originating within a vicinity of a mobile device that includes the gyroscope sensor. The one or more respective processors are configured to receive signal representations of the mechanical vibrations that are sensed by the gyroscope sensor at a sampling frequency, and transmit the signal representations that are received at the sampling frequency as a respective vibration signal associated with sampling times. The signal processor is coupled to the multiple mobile devices. The signal processor is configured to receive, from each mobile device, the vibration signal associated with sampling times transmitted by the respective mobile devices that include the one or more respective processors. The signal processor is configured to interleave the vibration signal received from each mobile device to generate an upsampled vibration signal having a sampling frequency greater than the sampling frequency of the one or more respective processors of each mobile device. The signal processor is configured to process the upsampled vibration signal with one or more machine learning filters to generate a processed upsampled vibration signal representing a combination of the mechanical vibrations sensed by each gyroscope sensor, and transmit the processed upsampled vibration signal. The signal transmitter is coupled to the signal processor. The signal transmitter is configured to receive the processed upsampled vibration signal transmitted from the signal processor and output the processed upsampled vibration signal.

Aspects of the disclosure combinable with any of the other aspects include the following features. To interleave the vibration signal, the signal processor is configured to align the vibration signals received from the respective mobile devices in time.

Aspects of the disclosure combinable with any of the other aspects include the following features. To align the vibration signals, the signal processor is configured to identify, from each of the received vibration signals, a vibration signal having a largest amplitude resulting in multiple peak vibration signals, each associated with each gyroscope sensor, and align the multiple peak vibration signals to generate the upsampled vibration signal.

Aspects of the disclosure combinable with any of the other aspects include the following features. To align the multiple peak vibration signals, the signal processor is configured to apply a weighting factor to each peak vibration signal of the multiple vibration signals, and determine a weighted sum of each weighted peak vibration signal.

Aspects of the disclosure combinable with any of the other aspects include the following features. To process the upsampled vibration signal with one or more machine learning filters to generate the processed upsampled vibration signal representing the combination of the vibrations sensed by each gyroscope sensor, the signal processor is configured to implement a neural network filter.

Aspects of the disclosure combinable with any of the other aspects include the following features. The system includes a source configured to produce the signals. The source is positioned within the spatial arrangement.

Aspects of the disclosure combinable with any of the other aspects include the following features. The source is positioned substantially equidistant from each mobile device of the multiple mobile devices.

Aspects of the disclosure combinable with any of the other aspects include the following features. The signal processor is configured to determine, using the processed upsampled signal, properties of the signals originating within the vicinity of the mobile device.

Aspects of the disclosure combinable with any of the other aspects include the following features. The multiple mobile devices are spaced apart from each other on a surface of a body configured to conduct the mechanical vibrations caused by the signal.

Certain aspects of the subject matter described in this disclosure can be implemented as a method. A signal processor receives, from multiple mobile devices, multiple vibration data sets. Each vibration data set includes vibration signals detected by a gyroscope sensor included in a respective mobile device and time stamps of times at which the gyroscope sensor detected the respective vibration signals. The vibration signals received from each mobile device are interleaved to generate an upsampled vibration signal having a sampling frequency greater than a sampling frequency at which each gyroscope sensor detected the respective vibration signals. The upsampled vibration signal is processed with one or more machine learning filters to generate a processed upsampled signal representing a combination of the multiple vibration data sets received from the multiple mobile devices. The processed upsampled signal is transmitted.

Aspects of the disclosure combinable with any of the other aspects include the following features. To interleave the vibration signal, the vibration signals received from the respective mobile devices are aligned in time.

Aspects of the disclosure combinable with any of the other aspects include the following features. To align the vibration signals, a vibration signal having a largest amplitude is identified from each of the received vibration data sets resulting in multiple peak vibration signals, each associated with each gyroscope sensor, and the multiple peak vibration signals are aligned to generate the upsampled vibration signal.

Aspects of the disclosure combinable with any of the other aspects include the following features. To align the vibration signals, a weighting factor is applied to each peak vibration signal of the multiple vibration signals, and a weighted sum of each weighted peak vibration signal is determined.

Aspects of the disclosure combinable with any of the other aspects include the following features. A neural network filter is implemented to process the upsampled vibration signal with one or more machine learning filters to generate the processed upsampled signal representing the combination of the vibrations sensed by each gyroscope sensor.

Certain aspects of the subject matter described in this disclosure can be implemented as a system that includes one or more processors and a computer-readable medium storing instructions executable by the one or more processors to perform the following operations. Multiple vibration data sets are received from multiple mobile devices. Each vibration data set includes vibration signals detected by a gyroscope sensor included in a respective mobile device and time stamps of times at which the gyroscope sensor detected the respective vibration signals. The vibration signals received from each mobile device are interleaved to generate an upsampled vibration signal having a sampling frequency greater than a sampling frequency at which each gyroscope sensor detected the respective vibration signals. The upsampled vibration signal is processed with one or more machine learning filters to generate a processed upsampled signal representing a combination of the multiple vibration data sets received from the multiple mobile devices. The processed upsampled signal is transmitted.

Aspects of the disclosure combinable with any of the other aspects include the following features. To interleave the vibration signal, the vibration signals received from the respective mobile devices are aligned in time.

Aspects of the disclosure combinable with any of the other aspects include the following features. To align the vibration signals, a vibration signal having a largest amplitude is identified from each of the received vibration data sets resulting in multiple peak vibration signals, each associated with each gyroscope sensor, and the multiple peak vibration signals are aligned to generate the upsampled vibration signal.

Aspects of the disclosure combinable with any of the other aspects include the following features. To align the vibration signals, a weighting factor is applied to each peak vibration signal of the multiple vibration signals, and a weighted sum of each weighted peak vibration signal is determined.

Aspects of the disclosure combinable with any of the other aspects include the following features. A neural network filter is implemented to process the upsampled vibration signal with one or more machine learning filters to generate the processed upsampled signal representing the combination of the vibrations sensed by each gyroscope sensor.

Certain aspects of the subject matter described here can be implemented as a system that includes multiple mobile devices and a signal processor. The multiple mobile devices are spaced apart from each other in a spatial arrangement. Each mobile device includes a gyroscope sensor configured to detect mechanical vibrations caused by signals originating within a vicinity of a mobile device that includes the gyroscope sensor. Each mobile device includes one or more respective processors configured to receive representations of the mechanical vibrations sensed by the gyroscope sensor at a sampling frequency, and transmit the representations received at the sampling frequency as a respective vibration signal associated with sampling times. The signal processor is coupled to the multiple mobile devices. The signal processor is configured to generate a processed upsampled signal by interleaving the vibration signal received from each mobile device and processing the interleaved signal using one or more machine learning filters, and transmitting the processed upsampled signal.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4C shows a schematic of the convolutional upsampling procedure.

Like reference numbers and designations in the various drawings indicate like elements.

DETAILED DESCRIPTION

Certain implementations of the subject matter described in this disclosure can be implemented by combining multiple, independent sample sets of signal data. Each sample set includes multiple samples in the form of an n-tuple. Each n-tuple includes at least one inexact timestamp and a corresponding signal measurement. The $i^{th}$ sample set is sampled at a rate of $R_i$. Combining the multiple, independent sample sets results in a single, combined sample set with an effective, combined sample rate of $R_c$. The combined sample rate $R_c$ is greater than the individual sampling rate for each independent sample set. The single, combined sample set with the combined sample rate of $R_c$ provides a representation of the signal with greater accuracy than any of the said $i^{th}$ sample sets due to the presence of spectral components of at least $f_c=1/(2R_c)$ Hertz in the combined sample set.

Gyroscope sensor output is highly correlated with audible speech near the sensor, particularly, the y-axis component. By interleaving gyroscope samples from an array of different sensors, the effective sampling rate can be raised linearly with the number of sensors. By raising the sampling rate of a sound-sensitive sensing device, it is possible to repurpose the sensor array as if it were a low quality microphone.

Figure 1A:
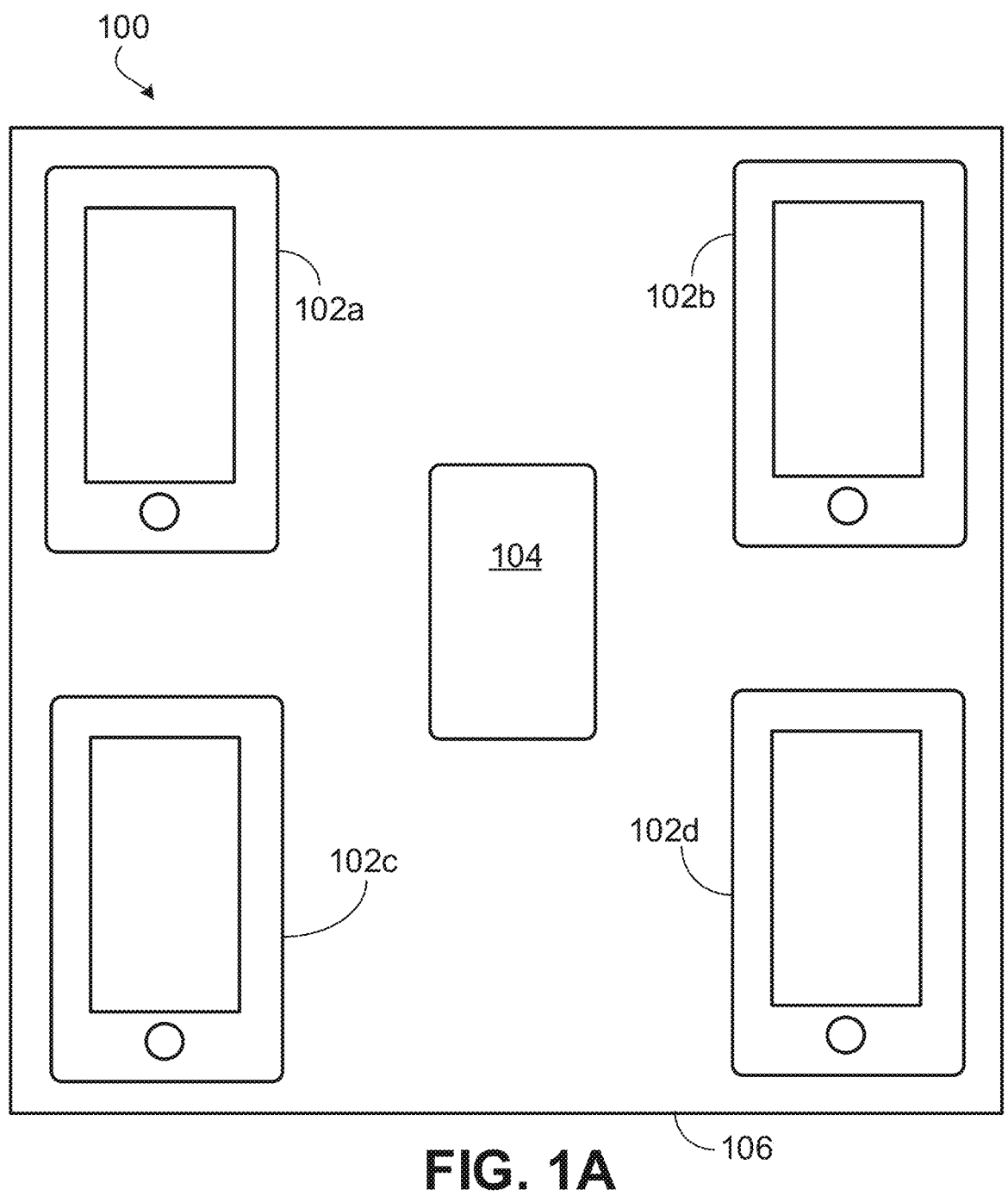
FIGS. 1A and 1B are schematic diagrams of mobile devices arranged to collect gyroscope data.
Figure 1B:
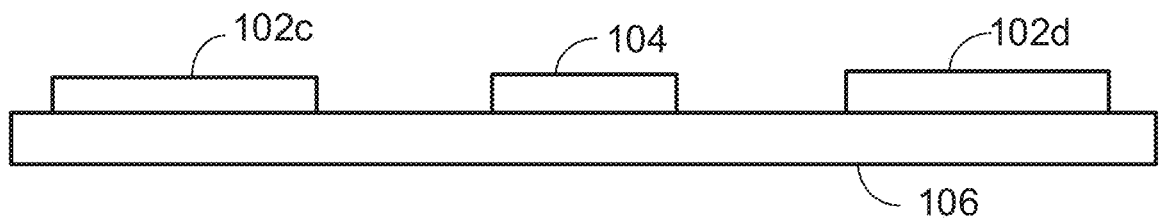

FIGS. 1A and 1B are schematic diagrams of mobile devices arranged to collect gyroscope data. FIG. 1A shows a top view of a spatial arrangement 100 in which multiple mobile devices (for example, mobile devices 102a, 102b, 102c, 102d) are spaced apart from each other. FIG. 1B shows a side view of the spatial arrangement 100. While four mobile devices are illustrated, the techniques described here can be implemented with fewer (for example, at least two) or more (for example, five or more) mobile devices. A mobile device can include any device that includes a sensor, for example, a gyroscope, that can detect mechanical vibrations caused by signals originating within a vicinity of the mobile device. In some implementations, the mobile device can include a smartphone, a tablet computer or other computer system that includes a gyroscope sensor.

A signal source 104 that can produce the signals that cause the mechanical vibrations can be positioned in the vicinity of the multiple mobile devices. In some implementations, the signals produced by the signal source 104 can be audio signals, for example, in the range of 20 Hz to 20,000 Hz. In some implementations, the signals produced by the signal source 104 need not be audio signals to the extent that audio signals are audible to a human ear. Example signals include any signal that can produce pressure fluctuations or vibrations through the air or medium on which the signal source 104 rests, for example, a tabletop. Such signals need not be audible to the human ear. The signal source 104 can produce an analog signal or a digital signal.

In some implementations, the signal source 104 can be positioned equidistant from each mobile device. In some implementations, the signal source 104 can be an audio transmitter, for example, a speaker, through which the signal can be transmitted or by which the signal can be produced. In some implementations, the multiple mobile devices and the signal source 104 can be positioned on a surface of a body 106 that can conduct the mechanical vibrations caused by the signal produced by the signal source 104. For example, the body 106 can be a body made of a sound-conductive material, for example, a metal. In some implementations, the mobile devices and the signal source need not be positioned on the same body or positioned on a sound-conductive body. For example, the mobile devices and the signal source can be positioned on separate bodies with the mechanical vibrations caused by the signal transmitted by the signal source being propagated through air.

Figure 2:
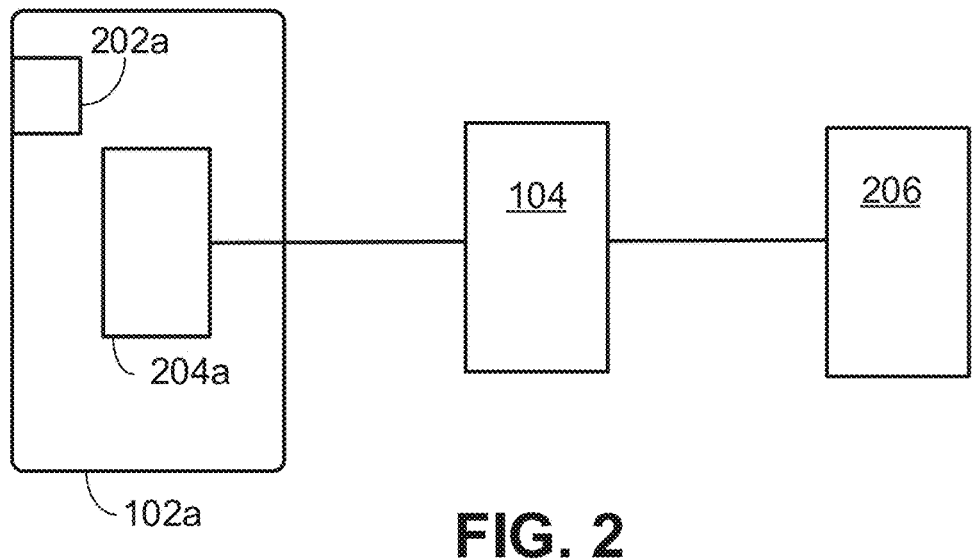
FIG. 2 is a schematic diagram of a signal processor to process gyroscope data collected by one of the mobile devices.

FIG. 2 is a schematic diagram of a signal processor 206 to process gyroscope data collected by one of the mobile devices, for example, mobile device 102a. The signal processor 206 can similarly process gyroscope data collected by the remaining mobile devices to generate a processed upsampled vibration signal described here. Details of the signal processor 206 are described below.

Features of and operations implemented by the mobile devices are described with reference to mobile device 102a. Similar or identical operations can be performed by other mobile devices, for example, mobile devices 102b, 102c, 102d. The mobile device 102a includes a gyroscope sensor 202a that can sense the mechanical vibrations caused by the signals originating within a vicinity of the mobile device 102a. For example, the gyroscope sensor 202a can sense the mechanical vibrations caused by the signal produced by the signal source 104. The gyroscope sensor 202a can convert the mechanical vibrations into signal representations of the mechanical vibrations, for example, into signals (analog or digital) whose magnitude depends on intensity of the mechanical vibrations.

The mobile device 102a includes one or more processors (for example, the processor 204a) connected to the gyroscope sensor 202a. The processor 204a can receive the signal representations of the mechanical vibrations at a sampling frequency. For example, the sampling frequency of the gyroscope sensor 202a can be 100 Hz resulting in theoretical Nyquist frequency of 50 Hz. In general, the gyroscope sensor 202a and the processor 204a can sample the mechanical vibrations at a frequency at which human speech is unintelligible. For example, the sampling frequency can less than about 20 kHz, which is considered the frequency at which humans can discern frequency content.

In some implementations, the processor 204a can assign a timestamp representing a sampling time for each signal representation received from the gyroscope sensor 202a. For example, if the gyroscope sensor 202a senses n mechanical vibrations based on its sampling frequency, and each of the n vibrations is spaced apart by time $\Delta t$, then the processor 204a can assign times t, $t+\Delta t+\varepsilon_1$, $t+2\Delta t+\varepsilon_2$ and so on to each sequentially sensed mechanical vibration, where $\varepsilon_n$ is an unknown time span caused by unavoidable drifting clock frequencies in the device hardware. In this manner, the processor 204a can generate a sample set of data pairs, each data pair including a vibration signal that is a signal representation of a mechanical vibration sensed by the gyroscope sensor 202a and a timestamp at which the signal representation was sensed. The processor 204a can transmit, i.e., provide as an output, the sample set to the signal processor 206. In this manner, the signal processor 206, which is connected to each mobile device in the spatial arrangement 100, receives a sample set from each mobile device.

Figure 3:
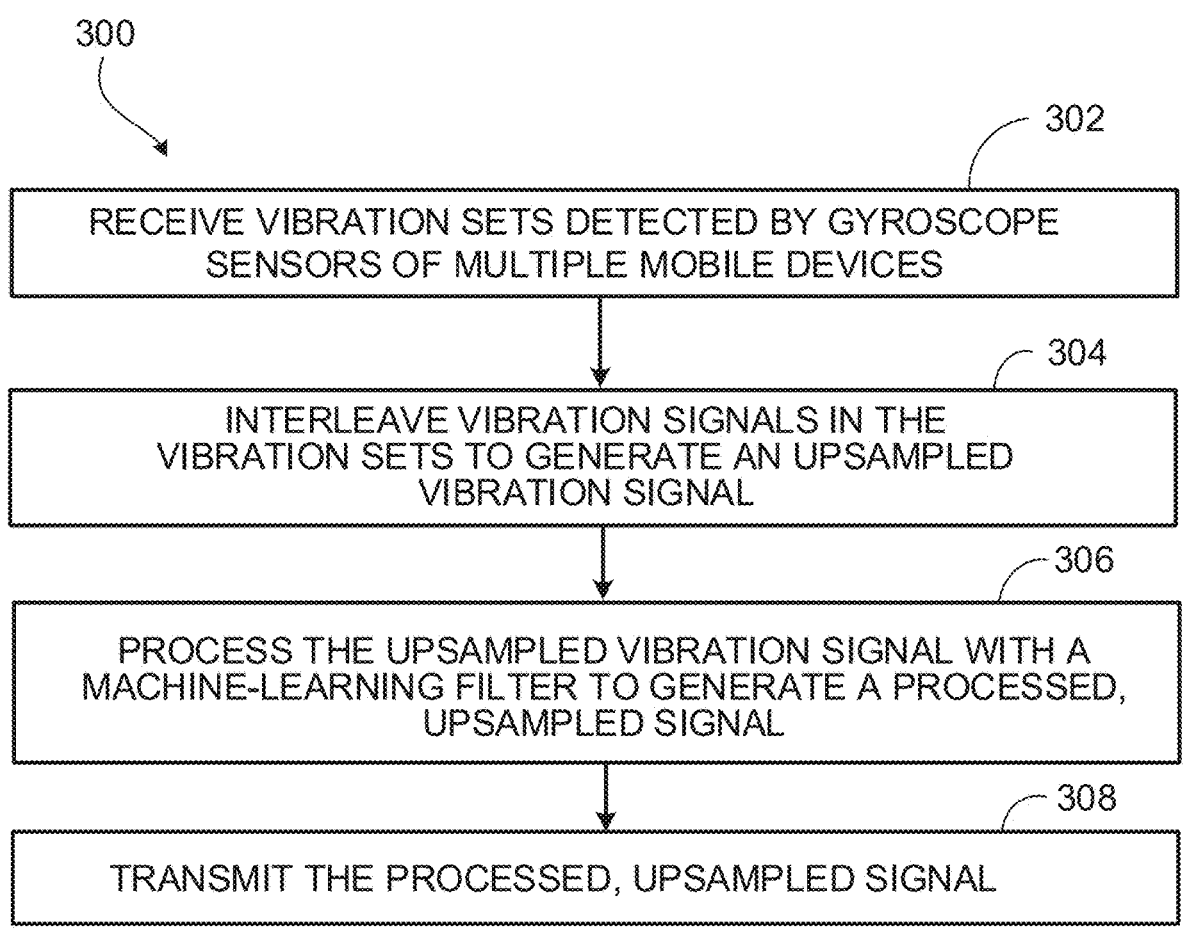
FIG. 3 is a flowchart of an example of a process for processing gyroscope data.

FIG. 3 is a flowchart of an example of a process 300 for processing gyroscope data. In some implementations, the signal processor 206 can implement the process 300. At 302, the signal processor 206 can receive vibration sets detected by the gyroscope sensors of multiple mobile devices. For example, the signal processor 206 can receive, from each mobile device, the respective sample set that includes the vibration signal associated with sampling times transmitted by the respective mobile devices. The clocking circuits of the mobile devices, i.e., the circuits that associate sampling times with the signals, can be independent and unsynchronized with respect to each other. Therefore, the sampling times received from one mobile device may not overlap those received from another mobile device. That is, even if the sampling frequencies of the mobile devices are the same, the sampling times may be different. Moreover, the sampling frequencies may not be the same but may vary, for example, by about 5%.

At 304, the signal processor 206 can interleave vibration signals in the vibration sets to generate an upsampled vibration signal. The upsampled vibration signal has a sampling frequency greater than the sampling frequency of the respective processor of each mobile device. In some implementations, to interleave the vibration signals, the signal processor 206 can align the vibration signals received from the respective mobile devices in time. To do so, the signal processor 206 can identify, from each of the received vibration signals, a vibration signal having a largest amplitude resulting in multiple peak vibration signals. Doing so can allow the signal processor 206 to leverage a single time offset or bias value to align the vibration signals. Each peak vibration signal is associated with a respective gyroscope sensor. The signal processor 206 can align the multiple peak vibration signals to generate the upsampled vibration signal. In some implementations, to align the vibration signals, the signal processor 200 can apply a weighting factor to each peak vibration signal and determine a weighted sum of each weighted peak vibration signal. In some implementations, the signal processor 206 can align the signals using quadratic peak interpolation to get a robust, sub-sample approximation of the exact time that all the mobile devices sensed a large magnitude signal.

In some implementations, the signal processor 206 can transform the non-uniformly sampled composite signal to one that has a uniform or constant sample rate. The transformation allows the Nyquist frequency to be increased by its maximum theoretical amount rather than settling for the Nyquist frequency corresponding to the largest time interval among any two consecutive time samples. To do so, the signal processor 206 can apply a curve fit to the composite non-uniform time samples and then resample the curve-fitted signal at Kx50 Hz where K is the number of mobile devices used to create the composite signal. The curve fit can be a simple, bicubic curve fit.

At 306, the signal processor 206 can process the upsampled vibration signal with a machine learning filter to generate a processed, upsampled signal. The machine learning filters in this application are used to manipulate the signal using convolutional and non-linear transforms of the signal such that a more "natural" signal is attained. The term "natural" is defined through several loss functions including the log-spectral difference and signal-to-noise ratio. The machine learning used in this disclosure includes the use of a multi-modal approach in which each branch of a convolutional neural network processes sensor data. Each branch takes a different transformation of the sensor as input, such as audio time series, Fourier transformed, and cepstral transformed. Moreover, it takes input from the interpolated signal as well as the raw signal from each sensor (after alignment). This enables the network to "correct" any mistakes from the original interleaving process by using the raw sensor data. Filtering layers are applied to each of the input branches to extract qualities of the signal as it passes through each layer. These filterings are traditional convolutional neural network branches that downsample (encode) the signal followed by upsampling (decode) layers for the time series signal. The audio time series layers include some additional processing. In particular, the time series layer also includes "residual" connections from the downsampling layers to upsampling layers. These residual inputs are provided to eliminate information loss from the input signal. After the upsampling, the output of the network is a reconstructed version of the signal in the time domain. Implementing the filtering techniques described here can reduce the need for high signal to noise ratios for capturing high quality signals.

In this manner, the signal processor 206 can increase a sampling frequency of the resulting signal to a sampling frequency that approaches or is intelligible to human speech. At 308, the signal processor 206 can transmit the processed, upsampled signal as an output. The processed, upsampled signal can be an audio signal that is intelligible to the human ear, for example, human speech. Alternatively, the processed, upsampled signal can be a signal with features that allow the signal to be processed like human speech. For example, the processed, upsampled signal can be processed to verify the speaker in a room, identify the accent, age or gender profile of an individual's voice or other analyses commonly performed on recordings of human speech.

EXAMPLE

Four mobile devices, each with a gyroscope sensor and a processor, were placed on a table in a random arrangement. A subwoofer was placed above the table, but not in direct contact with the table. A signal was used to drive the subwoofer. The signal was generated to consist of a linearly increasing frequency chirp that ranged from the lowest possible frequency to which the subwoofer was capable of responding up to 500 Hz which is ten times the Nyquist frequency of the gyroscope sensor sample rate. The generated signal is in the form of a frequency chirp that repeatedly increased from 30 Hz to 500 Hz in a linear fashion. While the subwoofer output this periodic frequency chirp, the gyroscope sensor output from each mobile device was recorded with local timestamps for each mobile device.

Figure 4A:
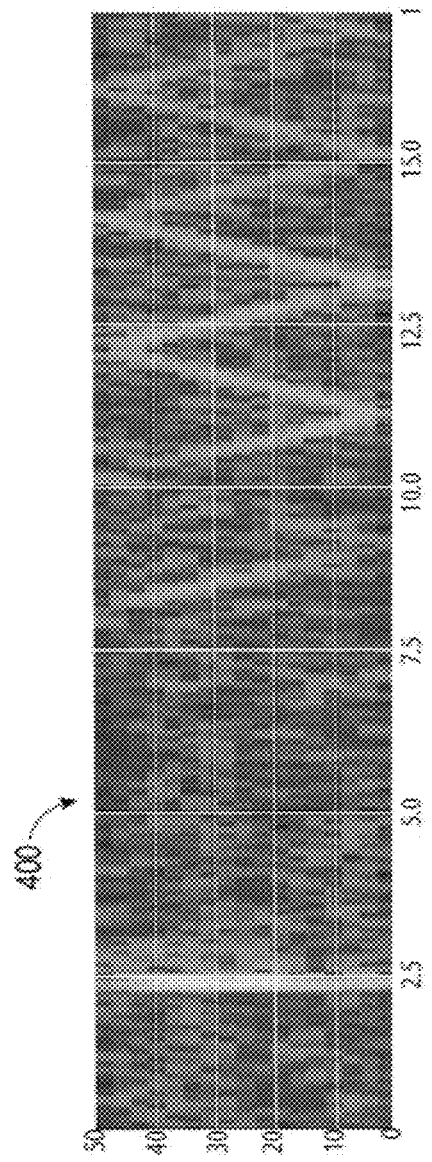
FIG. 4A is a spectrogram of gyroscope data obtained from one mobile device.

FIG. 4A is a spectrogram 400 of gyroscope data obtained from one mobile device. The X-axis represents time units and the Y-axis represents gyroscope sensor output in Hz. The energy burst at 2.5 time units is an alignment or synchronization event. The triangular waveform on the right most side of the spectrogram 400 represents the gyroscope frequency. The gyroscope sensor responds to and reproduces the frequency chirp up to 50 Hz whereupon it then decreases back to zero Hz before repeating. The decreasing portion of the waveform is the gyroscope sensor's response to chirp frequencies greater than 50 Hz and indicates that the higher frequency portions of the signal are aliased.

Figure 4B:
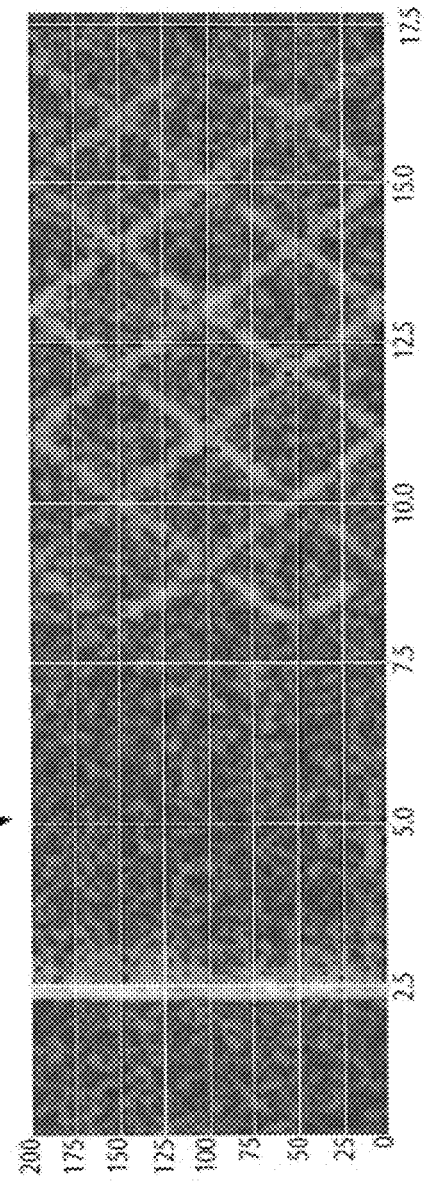
FIG. 4B is a spectrogram of upsampled gyroscope data obtained from multiple mobile devices.

FIG. 4B is a spectrogram 450 of upsampled gyroscope data obtained from multiple mobile devices by performing the upsampling (also known as interleaving) operations described here. The spectrogram 450 shows that the frequency chirp is being detected in the composite, upsampled signal with frequency content up to and including 200 Hz. The result indicates that an array of gyroscope sensor data can be used to create an upsampled signal such that, given a sufficient number of sensors, human speech can become intelligible utilizing only gyroscope sensor data obtained at low sampling rates. The technique of aligning timestamps and upsampling (called "smart interleaving") can be combined with neural network upsampling to achieve and even more refined and reliable upsampling using convolutional neural network filters. As described earlier, each gyroscope signal is first aligned with a peak interpolation signal. Once aligned in time, each signal is resampled to be at a consistent sampling rate in relation to one another using the bicubic time interpolation approach. Zeros are then interleaved into the signal and the signals are convolved with a convolutional neural network that is trained to take a weighted sum of each convolved signal to form an amalgamated signal that is upsampled audio output. This procedure can greatly enhance the fidelity of the upsampled audio. FIG. 4C shows a schematic of the convolutional upsampling procedure.

In summary, this disclosure describes a method and system for combining signal samples representing the same signal but originating from multiple unsynchronized sensors. The method produces an estimate of the signal in the form of a set of time samples in which the estimated signal has a higher bandwidth, i.e., has an enhanced and decreased sample rate, as compared to the signal samples obtained from the sensors. The disclosure also describes a method for producing the estimated signal in which the method includes a combination of interleaving, correlation, and machine learning techniques. The sensor signal samples are first correlated and aligned in time followed by producing a single composite estimated signal by interleaving the correlated sensor signal samples. The estimated signal is further enhanced through the use of machine learning methods where the enhancement is such that the estimated processed signal is caused to more closely approximate the actual signal that was sampled by the sensors.

Figure 5:
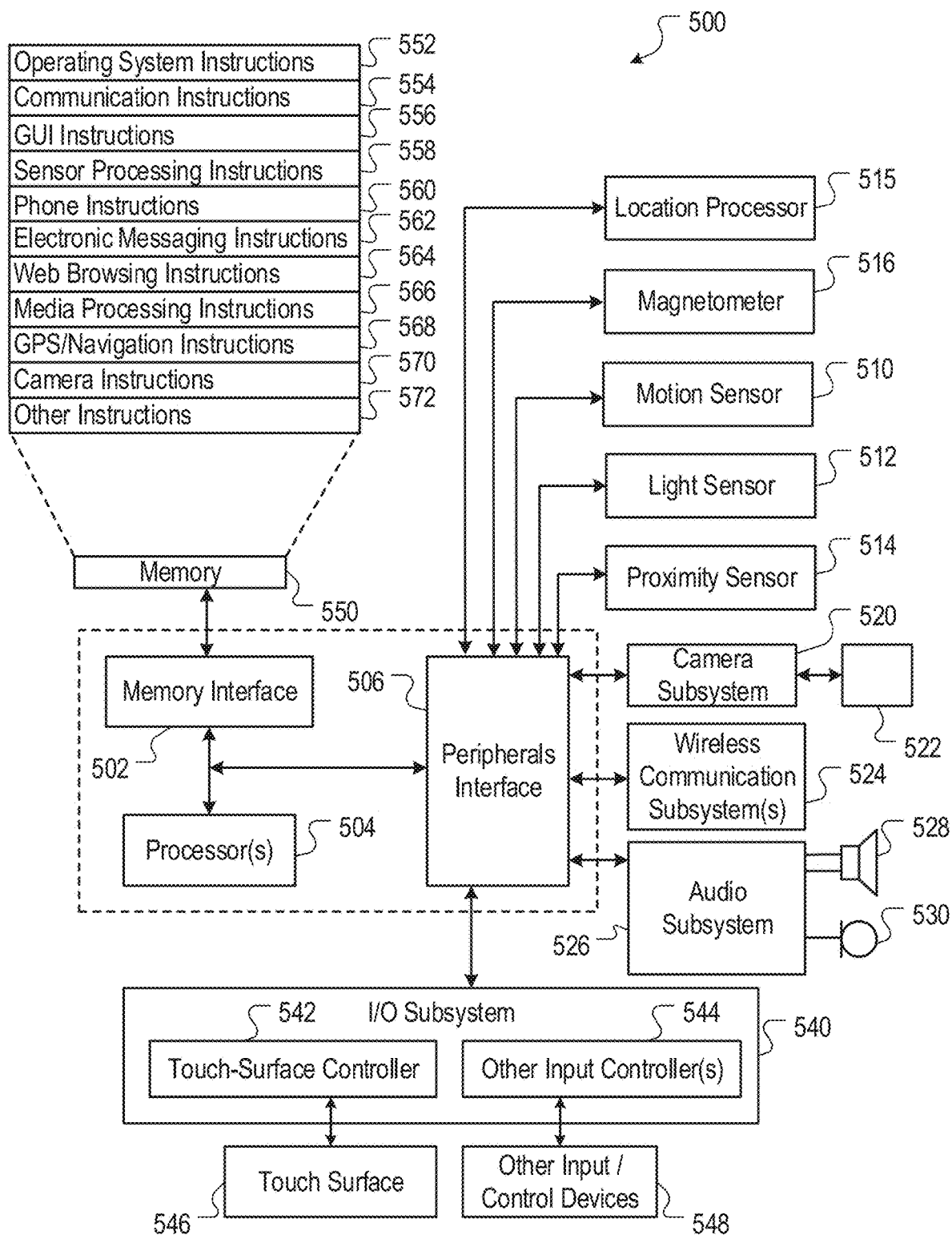
FIG. 5 is a block diagram of example device architecture for implementing the features and processes described with reference to previous figures.

FIG. 5 is a block diagram of example device architecture for implementing the features and processes described in reference to other drawings. Architecture 500 may be implemented in any computing device for generating the features and processes described in reference to the other figures, including but not limited to smart phones and wearable computers (e.g., smart watches, fitness bands). Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, gyroscope) may be utilized to detect movement and orientation of the device. Accordingly, display objects or media may be presented according to a detected orientation (e.g., portrait or landscape).

Other sensors may also be connected to peripherals interface 506, such as a temperature sensor, a barometer, a biometric sensor, or other sensing device, to facilitate related functionalities. For example, a biometric sensor can detect fingerprints and monitor heart rate and other fitness parameters.

Location processor 515 (e.g., GNSS receiver chip) may be connected to peripherals interface 506 to provide georeferencing. Electronic magnetometer 516 (e.g., an integrated circuit chip) may also be connected to peripherals interface 506 to provide data that may be used to determine the direction of magnetic North. Thus, electronic magnetometer 516 may be used as an electronic compass.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 524 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, device 500 may present recorded audio and/or video files, such as MP3, AAC, and MPEG video files. In some implementations, device 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, iOS, WINDOWS, or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device.

Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes and functions; camera instructions 570 to facilitate camera-related processes and functions; and other instructions 572 for implementing the features and processes, as described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed implementations may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system comprising:
    a plurality of mobile devices spaced apart from each other in a spatial arrangement, each mobile device comprising a sensor configured to sense mechanical vibrations originating within a vicinity of a mobile device that comprises a gyroscope sensor;

one or more respective processors configured to:
- receive, from the plurality of mobile devices, vibration signals associated with sampling times transmitted by the plurality of mobile devices, each vibration signal being a signal representation of the mechanical vibrations sensed by the sensor of each of the plurality of mobile devices, the signal representation sampled at a sampling frequency;
- combine the vibration signal received from each mobile device to generate an upsampled vibration signal having a sampling frequency greater than the sampling frequency at which the vibration signal was sampled, wherein, to combine the vibration signal comprises to interleave the vibration signals, wherein, to interleave the vibration signals comprises to align the vibration signals received from the respective mobile devices in time, and wherein to align the vibration signals comprises to identify, from each of the received vibration signals, a vibration signal having a largest amplitude resulting in a plurality of peak vibration signals, each associated with each sensor, and align the plurality of peak vibration signals to generate the upsampled vibration signal;
- process the upsampled vibration signal with one or more machine learning filters to generate a processed upsampled vibration signal representing a combination of the mechanical vibrations sensed by each sensor; and
- transmit the processed upsampled vibration signal; and
a transmitter coupled to the processor, the transmitter configured to:
- receive the processed upsampled vibration signal transmitted from the processor; and
- output the processed upsampled vibration signal.

2. The system of claim 1, wherein, to align the plurality of peak vibration signals, the processor is configured to:
- apply a weighting factor to each peak vibration signal of the plurality of peak vibration signals; and
- determine a weighted sum of each weighted peak vibration signal.

3. The system of claim 1, wherein, to process the upsampled vibration signal with one or more machine learning filters to generate the processed upsampled vibration signal representing the combination of the vibrations sensed by each sensor, the processor is configured to implement a neural network filter.

4. The system of claim 1, further comprising a source configured to produce the mechanical vibrations, wherein the source is positioned within the spatial arrangement.

5. The system of claim 4, wherein the source is positioned substantially equidistant from each mobile device of the plurality of mobile devices.

6. The system of claim 1, wherein the processor is configured to determine, using the processed upsampled signal, properties of the mechanical vibrations originating within the vicinity of the mobile device.

7. The system of claim 1, wherein the plurality of mobile devices are spaced apart from each other on a surface of a body configured to conduct the mechanical vibrations.

8. The system of claim 1, wherein the sensor comprises a gyroscope or an accelerometer.

9. A method comprising:
- receiving, by a processor and from a plurality of mobile devices, a plurality of vibration data sets, each vibration data set comprising vibration signals detected by a sensor included in a respective mobile device and time stamps of times at which the sensor detected the respective vibration signals;
- combining the vibration signals received from each mobile device to generate an upsampled vibration signal having a sampling frequency greater than a sampling frequency at which each sensor detected the respective vibration signals, wherein combining the vibration signals comprises interleaving the vibration signals, wherein interleaving the vibration signals comprises aligning the vibration signals received from the respective mobile devices in time, and wherein aligning the vibration signals comprises identifying, from each of the received vibration data sets, a vibration signal having a largest amplitude resulting in a plurality of peak vibration signals, each associated with each sensor, and aligning the plurality of peak vibration signals to generate the upsampled vibration signal;
- processing the upsampled vibration signal with one or more machine learning filters to generate a processed upsampled signal representing a combination of the plurality of vibration data sets received from the plurality of mobile devices; and
- transmitting the processed upsampled signal.

10. The method of claim 9, wherein aligning the plurality of peak vibration signals comprises:
- applying a weighting factor to each peak vibration signal of the plurality of vibration signals; and
- determining a weighted sum of each weighted peak vibration signal.

11. The method of claim 9, wherein processing the upsampled vibration signal with one or more machine learning filters to generate the processed upsampled signal representing the combination of the vibrations sensed by each sensor comprises implementing a neural network filter.

12. The method of claim 9, wherein the sensor comprises a gyroscope or an accelerometer.

13. A system comprising:
one or more processors; and
a non-transitory computer-readable medium storing instructions executable by the one or more processors to perform operations comprising:
- receiving, from a plurality of mobile devices, a plurality of vibration data sets, each vibration data set comprising vibration signals detected by a sensor included in a respective mobile device and time stamps of times at which the sensor detected the respective vibration signals;
- combining the vibration signals received from each mobile device to generate an upsampled vibration signal having a sampling frequency greater than a sampling frequency at which each sensor detected the respective vibration signals, wherein combining the vibration signals comprises aligning the vibration signals received from the respective mobile devices in time, and wherein aligning the vibration signals comprises identifying, from each of the received vibration data sets, a vibration signal having a largest amplitude resulting in a plurality of peak vibration signals, each associated with each sensor, and aligning the plurality of peak vibration signals to generate the upsampled vibration signal;
- processing the upsampled vibration signal with one or more machine learning filters to generate a processed upsampled signal representing a combination of the plurality of vibration data sets received from the plurality of mobile devices; and
- transmitting the processed upsampled signal.

14. The system of claim 13, wherein aligning the plurality of peak vibration signals comprises:
   applying a weighting factor to each peak vibration signal of the plurality of vibration signals; and
   determining a weighted sum of each weighted peak vibration signal.

15. The system of claim 13, wherein processing the upsampled vibration signal with one or more machine learning filters to generate the processed upsampled signal representing the combination of the vibrations sensed by each sensor comprises implementing a neural network filter.

* * * * *